(12) United States Patent
Cocksedge

(10) Patent No.: US 6,450,111 B1
(45) Date of Patent: Sep. 17, 2002

(54) FAN-BASED PROPULSION AND PRESSURE FLOW SYSTEM

(76) Inventor: Graham G. Cocksedge, 10271 Dewdney Trunk Road, Mission, British Columbia (CA), V2S 1L1

( * ) Notice: Subject to any disclaimer, the term of this patent is extended or adjusted under 35 U.S.C. 154(b) by 0 days.

(21) Appl. No.: 09/692,228

(22) Filed: Oct. 20, 2000

(30) Foreign Application Priority Data

Aug. 10, 2000 (CA) .......................................... 2316094

(51) Int. Cl.$^7$ ................................................ B63B 1/34
(52) U.S. Cl. ...................... 114/67 A; 440/90
(58) Field of Search ............................ 440/37, 38, 90, 440/91, 92, 93; 114/67 A, 67 R

(56) References Cited

U.S. PATENT DOCUMENTS

| | | | | |
|---|---|---|---|---|
| 3,125,981 A | * | 3/1964 | Reynolds ..................... | 440/93 |
| 3,134,443 A | * | 5/1964 | Snow .......................... | 440/93 |
| 3,326,296 A | * | 6/1967 | Hill et al. ................. | 114/67 A |
| 4,883,240 A | * | 11/1989 | Adamson et al. ........... | 244/1 R |
| 6,293,492 B1 | * | 9/2001 | Yanagisawa ............... | 244/17.23 |

FOREIGN PATENT DOCUMENTS

| | | |
|---|---|---|
| CA | 236117 | 12/1923 |
| CA | 237065 | 1/1924 |
| CA | 243059 | 9/1924 |
| CA | 251949 | 7/1925 |
| CA | 587408 | 11/1959 |
| CA | 617318 | 3/1961 |
| CA | 781805 | 4/1968 |
| CA | 817241 | 7/1969 |
| CA | 847722 | 7/1970 |
| WO | WO 98/03795 | 1/1998 |

OTHER PUBLICATIONS

Woods Practical Guide to Fan Engineering, Woods of Colchester Ltd., England, 1952, Benham & Co. Ltd. Colchester, pp. 83–102, Section 13, Fans.

* cited by examiner

Primary Examiner—Stephen Avila
(74) Attorney, Agent, or Firm—Paul Smith; Paul Smith Intellectual Property Law

(57) ABSTRACT

There is provided a combined pressure and thrust fan consisting of a solid circular disk with a plurality of radially spaced airfoil-shaped blades. The selective direction of airflow over an aft sector of the fan provides net thrust. The fan may be mounted in an air cushion vehicle with appropriate ducting or vanes to cause the major portion of the airflow to move radially through the aft sector. The fan according to the invention may also be used as an immersed propulsion system.

21 Claims, 6 Drawing Sheets

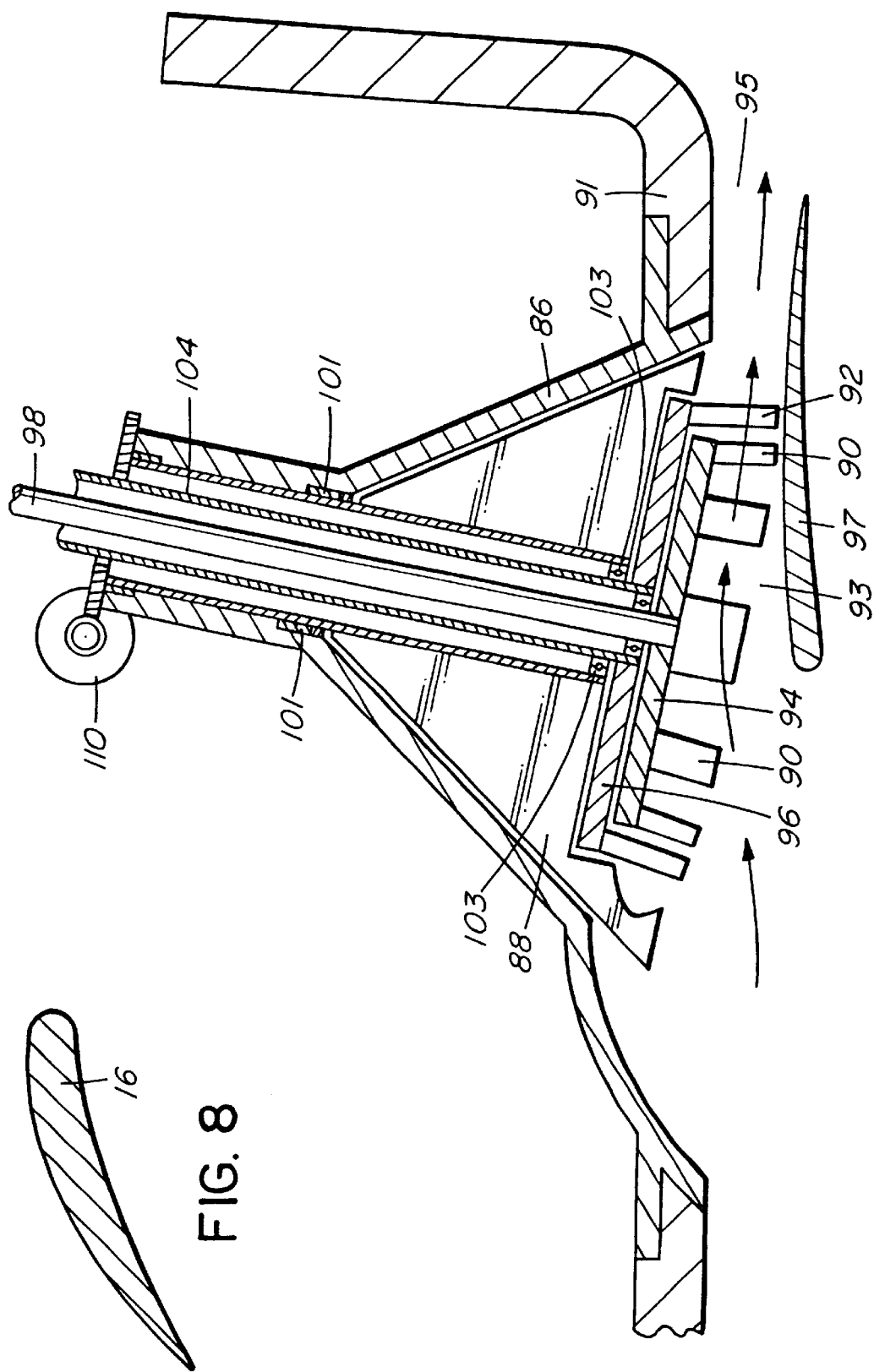

FAN-BASED PROPULSION AND PRESSURE FLOW SYSTEM

FIELD OF THE INVENTION

This invention relates to the propulsion of craft and to a fan for providing thrust and pressure in a fluid medium, be it gaseous or liquid. More particularly, this invention relates to a fan for providing thrust and pressure for air-cushion vehicles and watercraft.

BACKGROUND OF THE INVENTION

Propeller-based propulsion systems typically use axial propellers, as is well known in the case of boats and aircraft. Such propellers comprise a rotating shaft having radially extending blades that are immersed in the fluid to provide propulsion. The propeller blades are typically shaped so as to optimize thrust. The use of airfoil shapes for the blades is common.

Centrifugal fans on the other hand are usually designed to provide airflow under pressure rather than thrust. They are sometimes known as pressure fans. Centrifugal fans according to the prior art comprise an impeller having blades mounted on the disk of the fan or around the periphery of the impeller in a manner similar to a furnace fan. The blades are typically angled so as to draw air inward along the impeller's rotating axis and discharge it centrifugally in a radial direction where the rapidly moving air is usually collected by a housing and directed to an outlet to provide a pressurized air flow.

The shape of the blades of a centrifugal fan can influence the force exerted on the air, the proportion of energy imparted in the form of air velocity and other factors. For example, Canadian Patent No. 2217829 discloses a centrifugal ventilator exhaust fan that provides high volumetric airflow and generates reduced noise by the use of flat, backwardly inclined and partially curved blades.

U.S. Pat. No. 4,946,348 discloses a centrifugal fan with an impeller comprising a plurality of rearwardly curved blades and a plurality of airfoil vanes positioned axially displaced with respect to the curved blades and located within an annular passageway. The airfoil vanes act to convert the swirl energy of the fluid into pressure.

U.S. Pat. No. 5,279,379 discloses a combined propulsion and lift system for an air-cushion vehicle that includes an axial fan for thrust and a centrifugal fan for cushion pressure wherein both fans are mounted on a common shaft.

Such prior art systems have certain limitations and disadvantages. Conventional centrifugal fans like those described in Canadian Pat. No. 2217829 and in U.S. Pat. No. 4,946,348 provide pressure but no useful thrust. The combined lift-thrust system described in U.S. Pat. No. 5,279,379 simplifies the previous arrangements of fans and propellers used in air-cushion vehicles by providing a common driving source for both the axial propeller and the centrifugal fan. But no prior art approach provides a fan that effectively delivers both pressure and thrust.

It is therefore an object of the present invention to provide a fan that provides both thrust and pressure in the context of a working fluid such as air or water.

One use of such fans for propulsion and cushion pressure is in air-cushion vehicles. Air-cushion vehicles require air pressure to support part or all of their weight over the cushion area. They also require thrust for forward motion and change of direction.

In larger prior art air-cushion vehicles, versions of centrifugal pressure fans are used to provide the cushion pressure airflow for lift. Centrifugal fans basically rely on a momentum change of the air-flow by transforming the mechanical energy input from the engine to kinetic energy in the air in the form of air velocity, and then convert this to pressure energy in the form of a static pressure head in the enclosed lift plenum of the vehicle. The air, and energy, is then dissipated more or less equally around the vehicle and usually no net thrust is provided in any given direction.

The thrust forces for air-cushion vehicles are usually generated by a purely thrust, axial propeller. The thrust propeller differs markedly from a pressure fan. First the fluid flow is into the plane of the propeller, parallel to the axis of rotation. Second, the thrust is provided by the joint action of suction on the leading surface caused by the airfoil shape of the propeller blades, and by the backwash which gives a thrust component by a momentum change to the fluid column. On the better thrust propellers, the suction action can provide up to ⅔ of the total thrust. In water the suction action is not as dramatic but still can account for up to ⅓ of the total thrust of the propeller.

The air-cushion industry thus far has used either two separate systems for the pressure and the thrust, or uses some compromise between the thrust propeller and pressure fan. The present invention allows the advantages of both types to be incorporated in one fan unit to provide a pressurized fluid column for a plenum and a direct thrust.

It is therefore a further object of this invention to provide a fan arrangement in an air-cushion vehicle that provides pressure to a lift plenum as well as thrust for the vehicle.

Another use of this invention is in what are called water jet-drives. In prior art jet drives, the engine drives an auger or screw-type bladed device to force a pressurized column of water into a venturi which converts the pressure to a velocity head. The momentum change in the water column from high pressure to high velocity is what provides the thrust. There is no opportunity to gain direct thrust from a foil reaction on the front surface of the blades. Consequently the overall efficiency of such water jets is limited. This invention provides pressurized water flow into the venturi and at the same time provides a direct thrust from the suction on foil shaped blades to provide higher overall thrusts than the conventional jet drives.

It is therefore a further object of this invention to provide a jet thrust device suitable for such things as propulsion of boats.

Other objects of the invention will be appreciated by reference to the following disclosure.

SUMMARY OF THE INVENTION

The invention provides a fan generally arranged like a centrifugal fan with the impeller consisting of a solid disk and having airfoil-shaped blades extending from the perimeter of the disk more or less parallel to the axis of rotation. The propeller-like blades of the fan according to the invention have the airfoil shapes of thrust propellers, necessary for efficient thrust, and the perimetral multi-blade arrangement of pressure fans that traditionally have allowed good pressure generation.

The fan may be used as a fluid propulsion system in a vehicle. The fan is mounted in a housing of the vehicle such that the fluid flow into the fan area is directed to impinge preferentially on one sector of the rotating fan with a component transverse to the blades. The blades in the preferred sector therefore strike the fluid transversely just as they would in an axial flow propeller with a substantial portion of the overall thrust generated by the fan being the result of suction from the advancing surface of the blade. If the flow were equal in each sector of the disk, the suction thrust components from each blade would cancel each other except for small components in the direction of flow that might be present because the blades are at some angle to the disk. When the majority of fluid flow is through one sector, then a significant net thrust is developed into the direction of the fluid flow. If vibrations occur on the fan due to aerodynamic imbalances because of the unequal sector flows, then one way to control these vibrations would be with a tube embedded in the fan around the periphery of the fan and containing lead shot. Such an arrangement is known to control imbalances and this feature is not part of the invention.

The action of the fan blade in the fluid flow is therefore like the blade action of an axial thrust propeller, but the overall fluid flow is similar to the radial flow of prior art centrifugal pressure fans. The fan is able to form efficient compromises between thrust and pressure demands better than either the traditional axial thrust propellers, the centrifugal pressure fans or any known combination of the two.

There are essentially no velocity differences across the flow in the thrust fan according to the invention, as would happen with an axial flow propeller with lower velocities near the centre of the propeller. The fan of the present invention also does not have hub areas in the centre of the flow and can provide high propeller tip speeds (necessary for pressure generation) to the fluid column but with relatively low angular velocity.

The present fan invention is particularly suited to the thrust-cushion vehicle concept disclosed by G. T. Cocksedge in Canadian Patent No. 781,805.

In one aspect, the invention comprises a combined thrust and pressure fan comprising a solid circular disk having an axis of rotation, and a plurality of radially spaced blades extending from the surface of said disk, each of said blades having a generally airfoil shape.

The chord of each of the blades may define an angle in relation to the direction of rotation of the disk so as to define an angle to the tangent of the disk. Preferably that angle is between 10 and 45 degrees.

The blades may also be tilted out of a proper parallel relationship with the axial direction, at an angle of between 0 and 50 degrees. Preferably the tilt is outward in relation to the center of the disk.

In another aspect, the invention comprises a propulsion system for propelling a vehicle for movement in relation to a fluid. The system includes a fan as described above mounted in the vehicle such that the axis of rotation of the disk is in the longitudinal vertical plane of the vehicle and defines an angle of between 0 and 50 degrees in relation to the vertical axis of the vehicle. The orientation of the fan thereby defines a sector of the fan which is aftward in relation to the other sectors of the fan. Means are provided for directing the flow of said fluid such that the flow of said fluid across the fan is preferentially through the aftward sector of the fan and in the rearward direction in relation to the vehicle. The means may comprise shaping of a cowling or vanes for directing the flow of air.

In another aspect, two stages of counter-rotating fans are provided to eliminate the swirl effect on the fluid exiting the fan, to minimize the gyroscopic forces caused by inertial imbalance and to allow a given pressure at lower tip speed.

In another aspect, the invention comprises a thrust and pressure system for an air cushion vehicle. The system includes at least one plenum chamber and an air outlet from the plenum chamber. A fan as described above is mounted for rotation generally forward of the plenum chamber and such that the axis of rotation of the disk defines an angle of between 0 and 50 degrees in relation to the vertical axis of the vehicle, and wherein the orientation of said disk defines an aft sector of the disk in relation to the vehicle. The aft sector is in air communication with the plenum chamber. Means are provided for directing the flow of air preferentially rearward and through the aft sector of the fan.

In another aspect of the invention, the axis of rotation of the disk defines an angle of between 15 and 45 degrees in relation to the vertical axis of the vehicle, the fan is mounted generally in the bow and the air flow is directed to the aftward portion of the fan by a portion of the bow that generally overlays a forward portion of the fan.

In another aspect, vanes are mounted on a cowling overlaying a portion of the fan in order to direct the flow of air to the aftward sector of the fan.

In another aspect, the invention comprises the adaptation of the above propulsion system for immersed propulsion in water. A solid circular disk having a plurality of airfoil-shaped blades mounted thereon is mounted for rotation in the water craft such that the axis of rotation of said disk defines an angle of between 0 and 50 degrees in relation to the vertical axis of the vehicle, and so as to define an aft sector of the disk in relation to the vehicle. The aft sector of the disk is immersed for rotation through the water, and such that the sectors of the disk other than said aft sector are substantially not immersed in the main water flow.

Preferably the immersed propulsion system includes a rotatable housing for selectively directing water flow toward a selected portion of the disk and the disk may be selectively raised or lowered in relation to the vehicle.

In another aspect the invention comprises a propulsion system for propelling a vehicle for movement in relation to a fluid. A fan is mounted for rotation in the vehicle. The fan comprises a solid circular disk, and a plurality of radially spaced blades extend from the surface of the disk, each blade having a generally airfoil shape. The fan is mounted such that a sector of the fan is relatively more aftward than the other sectors of the fan. Means are provided for directing the flow of the fluid across the fan, such that the principal volume of flow of the fluid is through the aftward sector of the fan and in the rearward direction in relation to the vehicle.

In yet another aspect, the fan is mounted such that the axis of rotation of the disk is substantially in the horizontal plane of the vehicle.

In another aspect, the invention comprises a combined thrust and pressure fan comprising a first and second solid circular disks arranged concentrically in relation to one another. Each disk has plurality of radially spaced blades extending from the surface of the disks, and each blade has a generally airfoil shape.

Other aspects of the invention will be appreciated by reference to the detailed description of the preferred and alternative embodiments and to the claims.

BRIEF DESCRIPTION OF THE DRAWINGS

The preferred and alternative embodiments of the invention will be described with reference to the accompanying drawings, in which:

FIG. 7 is a cross sectional view of a propulsion system according to the present invention wherein the fluid medium is water; and, FIG. 8 is a cross-sectional view of a fan blade having an airfoil shape according to the preferred embodiment of the invention.

DETAILED DESCRIPTION OF THE PREFERRED AND ALTERNATIVE EMBODIMENTS

Figure 1:
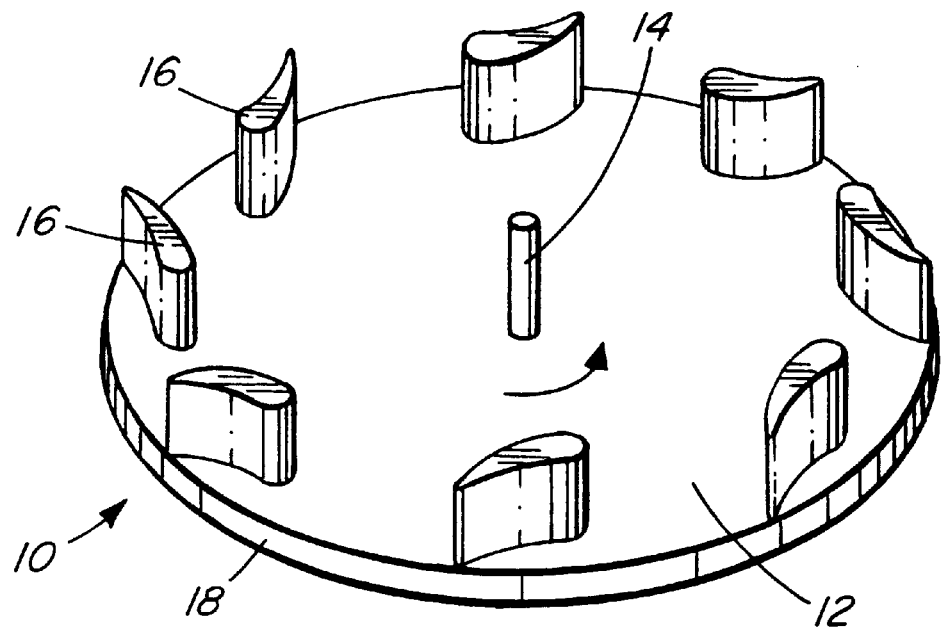
FIG. 1 is a perspective view of a fan disk according to the invention.

FIG. 1 illustrates a thrust fan 10 according to the invention without the ducting. Fan disk 10 comprises a solid circular disk 12 having an axis of rotation 14. A plurality of radially spaced blades 16 extend generally outward from the surface of the disk 10. In the preferred embodiment, blades 16 are located at the outer perimeter 18 of the disk 10, but it will be appreciated that they may also be spaced inward from the edge of the disk.

Figure 2:
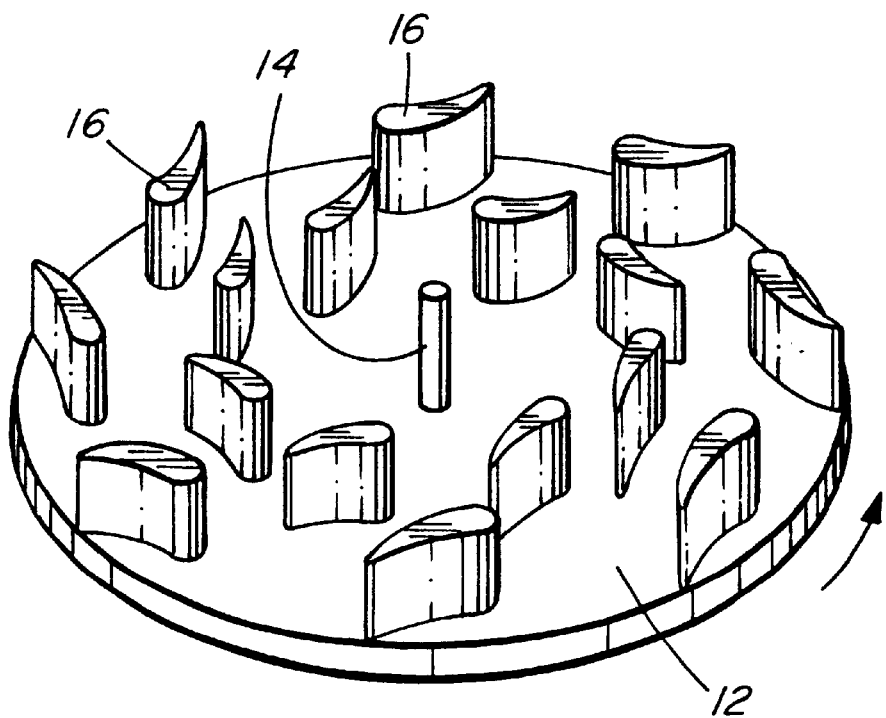
FIG. 2 is a perspective view of an alternative embodiment of the fan disk.

Each of blades 16 is preferably spaced an equal distance from the axis of rotation 14. However, it is contemplated that the invention would also be effective if two or more rings of blades were spaced from one another in the radial direction as illustrated in FIG. 2. In such an arrangement, care must be taken to ensure that the overall disk and the blades are properly balanced.

Figure 4:
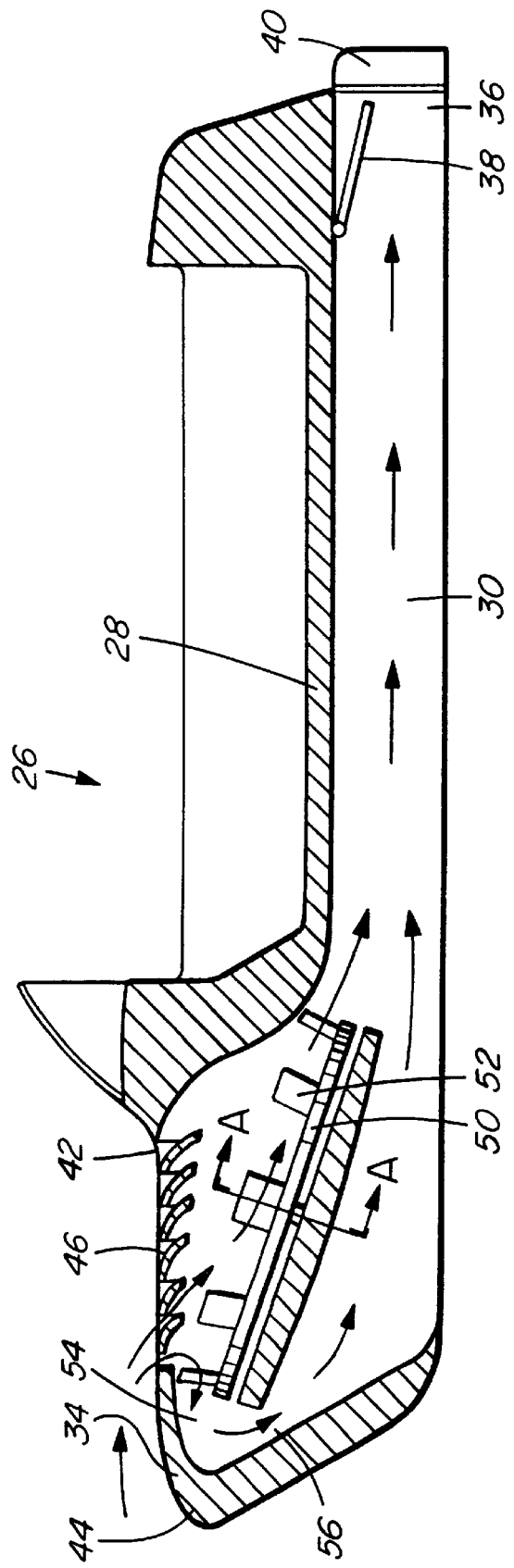
FIG. 4 is a sectional view of an air cushion vehicle using a fan according to the invention.

The blades 16 extend generally axially (outward from the surface of the disk 12) so as to be presented generally perpendicularly thereto. However, depending on the manner in which the fan is mounted in a vehicle, it may be desirable to optimize thrust by tilting the blades in relation to the axial direction. It is contemplated that any angle of up to 50 degrees to the vertical, with inclination toward or away from the axis of rotation 14, is within the scope of the present invention. A slight inclination to the outside is illustrated in FIG. 4.

Each blade 16 has a generally airfoil shape as best appreciated by reference to FIG. 1 and FIG. 8. Thus, fluid approaching the blades from a more or less outward radial direction is subject to suction from the airfoil shape of the blade cutting transversely through the fluid flow.

Referring to FIG. 1 and FIG. 2, the blades 16 may be provided with an angle in relation to the tangential direction of travel of the blades on the disk 10. Such angle will allow more efficient airfoil action. The preferred total angle by reference to the chord of the blade is between 10 and 45 degrees. The specific preferred angle will vary according to the speed of the blade and the desired speed of the fluid flow.

Figure 3:
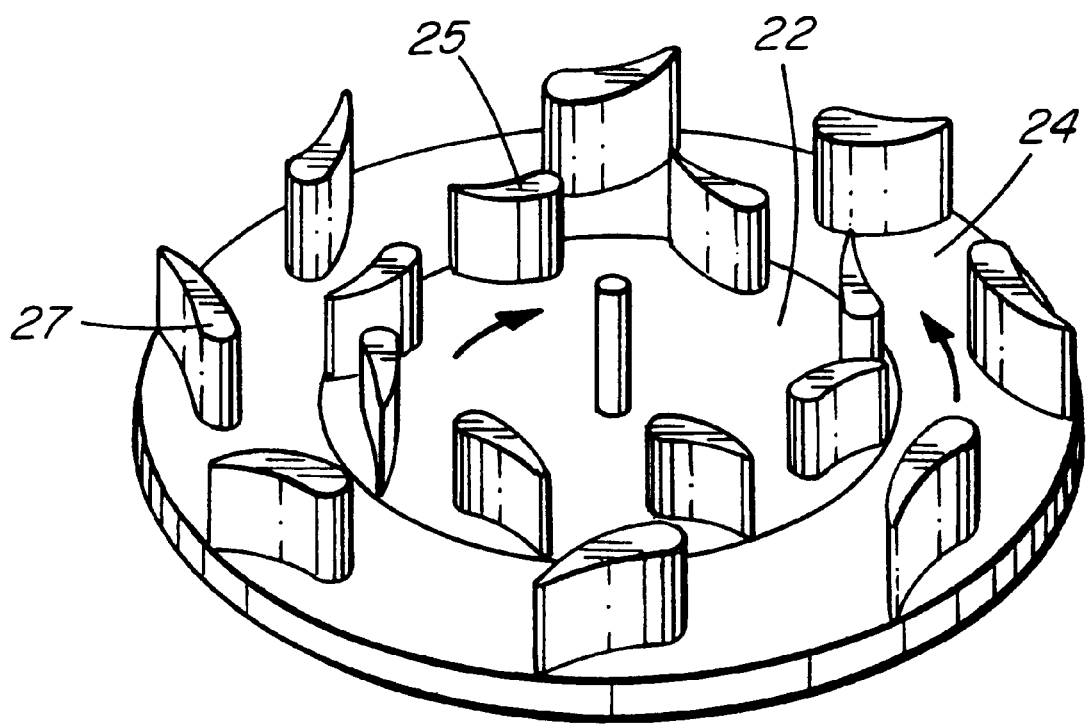
FIG. 3 is a perspective view of a two-stage fan.

FIG. 3 illustrates a two-stage fan disk 20 consisting of a disk 22 overlying, and in concentric relationship with, a second disk 24. Each disk is a solid circular disk and has a plurality of blades 25, 27 extending generally perpendicular to the disks. The two disks 22, 24 rotate in opposite directions. It will be appreciated that with two stages of counter-rotating blades, the same pressure of the air can be obtained with only two thirds of the usual blade velocity while the swirl of the air stream is considerably diminished, as compared to a one-stage fan according to the invention.

Figure 5:
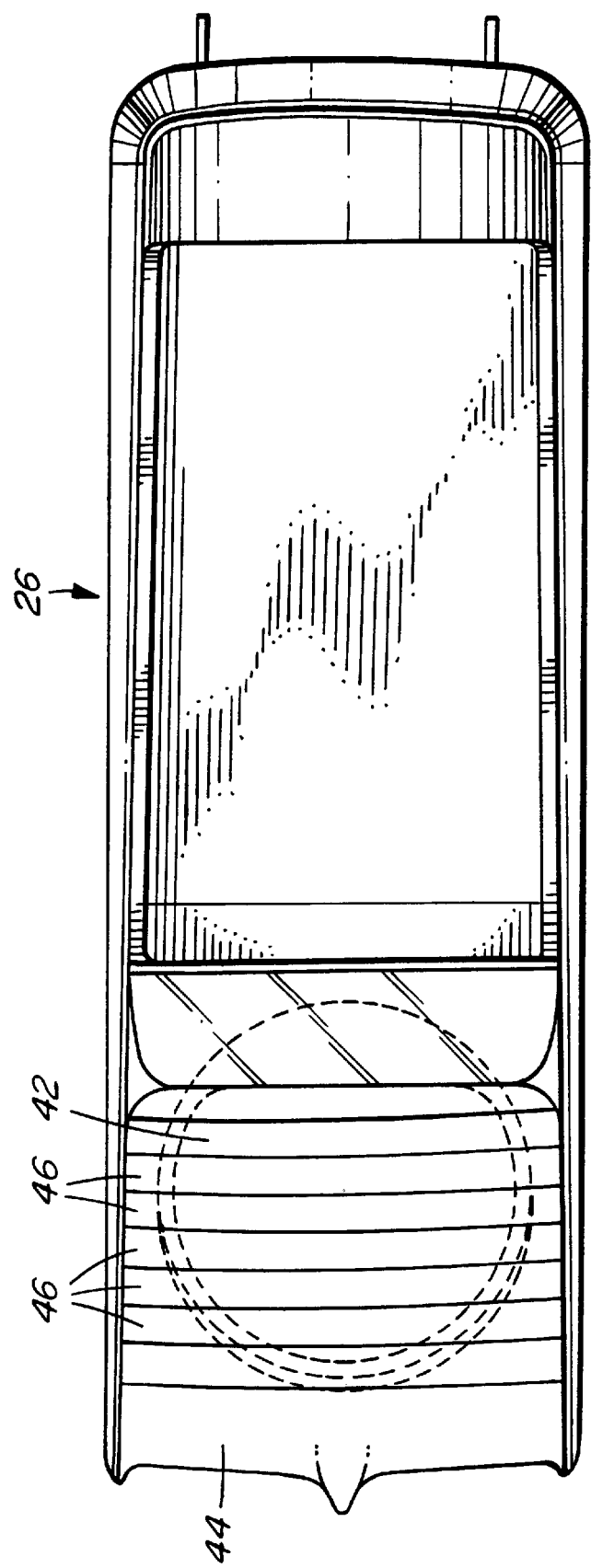
FIG. 5 is a top view of the air cushion vehicle of FIG. 4.

FIGS. 4 and 5 illustrate the use of the fan of FIG. 1 as a propulsion and lift system in a vehicle. The vehicle of the example is an air-cushion vehicle of the thrust-cushion type 26. The air-cushion vehicle 26 comprises a hull 28 which includes two parallel plenums extending from the cowling 34 to the stern 36 of the boat. Only one of the plenums 30 is visible in FIG. 4. Stern plates 38 are provided to control the outlet of air from the plenums. The rudders 40 steer the boat in yaw.

The fan is seated below a bow inlet opening 42. A bow shield 44 is provided in the front of the inlet opening 42. The fan disk is seated such that the forward sector of the fan is tucked behind the bow shield 44 and is therefore not within the principal airflow path over the bow. Preferably, the fan is also seated so as to be tilted at an angle. This minimizes the risk of injury to passengers in the passenger compartment should the fan become dislodged as it rotates. In this embodiment, the axis of rotation of the fan lies in the longitudinal vertical plane, and the degree of tilt from the vertical is between 0 and 50 degrees.

Guide plates or vanes 46 are provided over the top of the bow inlet opening 42 to redirect the airflow over the bow into the bow inlet opening. As will be appreciated by reference to the arrows in FIG. 4, the combination of the bow shield 44, the tilt of the fan and the guide plates 46 result in an airflow that has a radial component in the rear half of the fan, i.e. it enters the rear sector of the fan in a radial direction to provide a net thrust primarily against the main airflow, forward. The solid disk 50 of the fan directs the airflow radially toward the blades 52 thereby providing pressure as in a centrifugal fan. The principal volume of airflow is made to impinge on the airfoil shaped blades preferentially in the aft sector A—A of the fan thereby providing forward thrust. It is the selective direction of air flow over the aftward airfoil-like rotating blades that provides net thrust, while the centrifugal fan-like arrangement provides pressure.

Part of the air under pressure will exit the fan toward the bow portion of the fan as indicated by arrow 54 to provide pressure in the forward portion of the plenums through cavity 56.

It will be appreciated that although the preferred embodiment tilts the fan, the axis of rotation may be made fully vertical. In such case appropriate additional ducting may be required to ensure that the airflow exiting the fan is directed into the plenums.

It is also understood that the fan may be provided such that the axis of rotation is in the horizontal plane, the fan being effectively arranged in the same orientation on the vehicle as a waterwheel. In such case, appropriate ducting would be provided to direct airflow over the vehicle sideways generally toward the solid disk and toward the aft sector of the fan.

It will also be appreciated that the objects of the invention may also be achieved by combining two or more fans according to the invention. By doing so, each fan may be positioned in the vehicle so as to offset any imbalances. This also allows the orientation of each fan to deviate from the idealized balanced orientations described in the foregoing embodiments, i.e. with the axis of rotation fully in the longitudinal vertical plane or horizontal.

Figure 6:
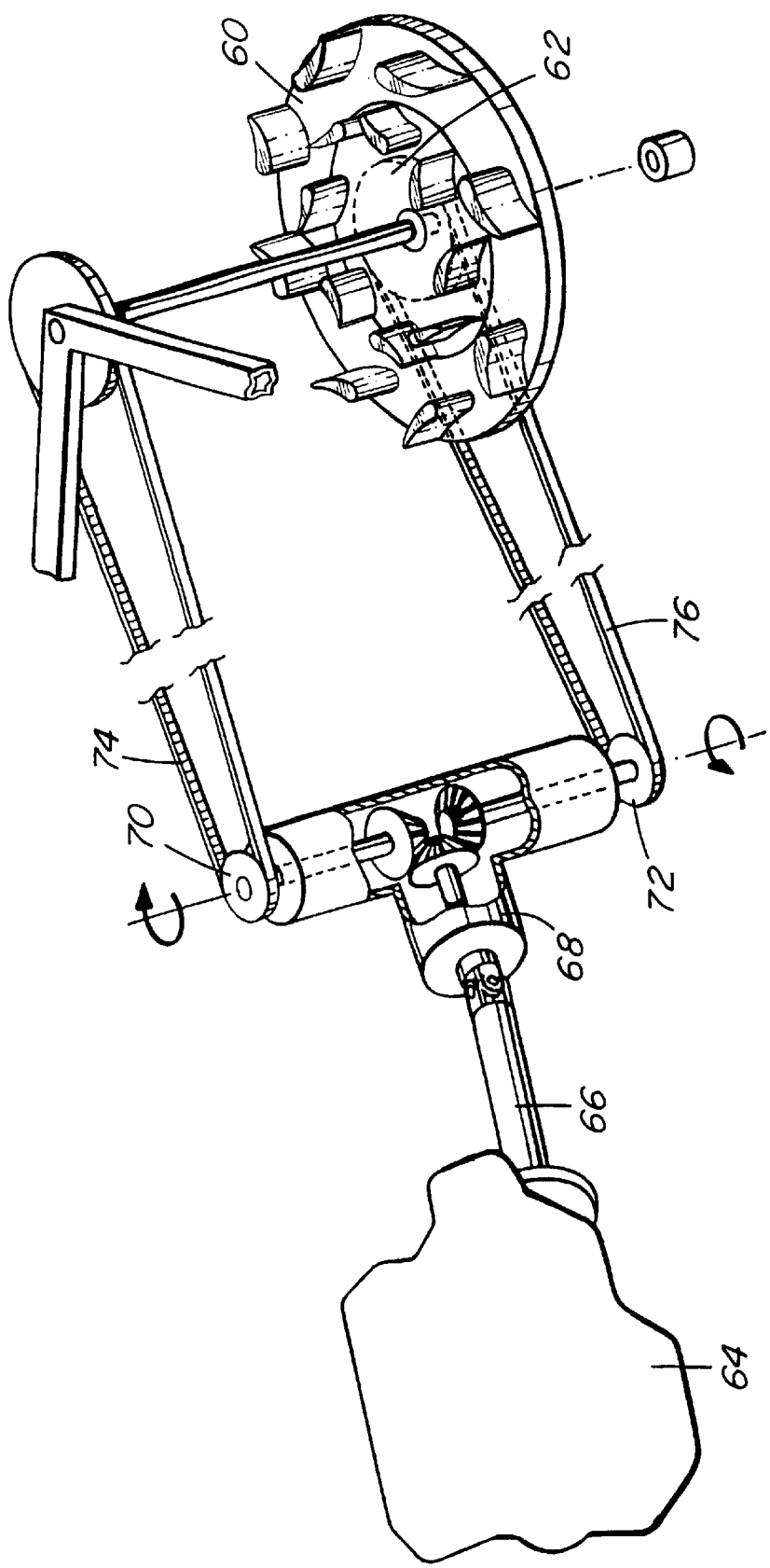
FIG. 6 is a diagram view of the drive system for a two-stage fan according to the invention.

FIG. 6 is a schematic view of a driving system of the two counter-rotating impellers 60, 62 of a two-stage fan according to the invention. The drive is taken from an engine 64 through a shaft 66 to a bevel gearbox 68 and further to an upper drive plate 70 and a lower drive plate 72. An upper toothed belt 74 and a lower toothed belt 76 transfer the rotation movement to counter-rotating impellers 60, 62.

Bearings allow a counter-rotating movement of the two solid disks around the same shaft.

FIG. 7 illustrates a second embodiment of the present invention in which the fluid propulsion medium is water and the vehicle being propelled is a boat. According to this embodiment, the two-stage fan is tilted within a fixed housing 86 such that one sector of the fan is immersed in the main water flow under the boat through a tunnel 93. Tunnel 93 is formed between the hull section 91 and a plate or other hull section 97, and the resulting water flow feeds out of venturi 95.

A rotating impeller housing 88 is shaped so as to direct almost the entire water flow toward a single sector of the blades 90, 92 thereby providing net thrust. The blades 90, 92 are mounted more or less perpendicularly to the plane of solid disks 94, 96 around their periphery. An impeller shaft 98 is driven to rotate within a larger hollow shaft 104 which is made to rotate in the direction opposite to the direction of rotation of the shaft 98.

A standard clutch known in the art could be included in the gearbox (not shown). The impeller housing 88 can be rotated by a steering motor 110 for directing the water flow and consequently the resulting thrust provided by the fan in the desired direction for example for the reverse motion of the boat. Suitable sealing means 101 and bearings 103 are mounted about the housing 88 and the shafts 98 and 104. Means are also provided to raise or lower the fan to selectively decrease or increase the immersion into the water, and therefore the thrust available from the propulsion system.

A rack and pinion system (not shown) could be added to the system for raising or lowering the entire fan assembly and therefore immersing the blades of the impeller more or less into or out of the main water flow.

It will be appreciated that alternative embodiments of configurations of fans and propulsion systems using the fans according to the invention have been described, but that variations in those embodiments may be practised without departing from the principles and scope of the invention.

What is claimed is:

1. A propulsion system for propelling a vehicle for movement in relation to a fluid, comprising:
    a fan mounted for rotation in said vehicle, said fan comprising a solid circular disk, and a plurality of radially spaced blades extending from the surface of said disk, each of said blades having a generally airfoil shape;
    said fan being mounted such that the axis of rotation of the disk is in the longitudinal vertical plane of the vehicle and defines an angle of between 0 and 50 degrees in relation to the vertical axis of the vehicle, whereby the orientation of said fan defines a sector of the fan which is aftward in relation to the other sectors of the fan; and
    means for directing the flow of said fluid such that the flow of said fluid across said fan is preferentially through said aftward sector of said fan and in the rearward direction in relation to said vehicle.

2. A propulsion system as in claim 1 wherein the chord of each of said blades defines an angle in relation to the direction of rotation of the blades on said disk.

3. A propulsion system as in claim 1 wherein said blades are tilted to define an angle of between 0 and 50 degrees in relation to the axial direction of the disk.

4. A propulsion system as in claim 3 wherein said blades are tilted away from the axis of rotation of the disk.

5. A propulsion system as in claim 2 wherein said blades define an angle of between 0 and 50 degrees in relation to the axial direction of disk.

6. A propulsion system as in claim 5 wherein said blades are tilted away from the axis of rotation of the disk.

7. A thrust and pressure system for an air cushion vehicle, comprising:
    at least one plenum chamber in said vehicle;
    an air outlet from said plenum chamber;
    a fan mounted for rotation in said vehicle, said fan comprising a solid circular disk, and a plurality of radially spaced blades extending from the surface of said disk, each of said blades having a generally airfoil shape;
    said fan being mounted generally forward of said plenum chamber and such that the axis of rotation of the disk defines an angle of between 0 and 50 degrees in relation to the vertical axis of said vehicle, and wherein the orientation of said disk defines an aft sector of said disk in relation to said vehicle;
    said aft sector of said disk being in air communication with said plenum chamber; and,
    means for directing the flow of air preferentially rearward and through said aft sector of said fan.

8. A propulsion system as in claim 7 wherein the chord of each of said blades defines an angle in relation to the direction of rotation of the blades on the disk.

9. A propulsion system as in claim 7 wherein said blades are tilted to define an angle of between 0 and 50 degrees in relation to the axial direction of the disk.

10. A propulsion system as in claim 9 wherein said blades are tilted away from the axis of rotation of the disk.

11. A propulsion system as in claim 8 wherein said blades define an angle of between 0 and 50 degrees in relation to the axial direction of disk.

12. A propulsion system as in claim 11 wherein said blades are tilted away from the axis of rotation of the disk.

13. A propulsion system as in claim 7 wherein the axis of rotation of the disk defines an angle of between 15 and 45 degrees in relation to the vertical axis of said vehicle, said fan is mounted generally in a bow portion of said air cushion vehicle and said means for directing the flow of air comprises a portion of the bow generally overlaying a forward portion of said fan.

14. A propulsion system as in claim 13 wherein said means for directing the flow of air further comprises vanes mounted on a cowling overlaying a portion of said fan.

15. A propulsion system for propelling a water craft comprising:
    a solid circular disk having a plurality of airfoil-shaped blades mounted for rotation in said water craft such that the axis of rotation of said disk defines an angle of between 0 and 50 degrees in relation to the vertical axis of said vehicle, and so as to define an aft sector of said disk in relation to said vehicle;
    said aft sector of said disk being immersed for rotation through said water, and such that the sectors of said disk other than said aft sector are substantially not immersed in said main water flow.

16. A propulsion system as in claim 15 further comprising a rotatable housing for selectively directing water flow toward a selected portion of said disk.

17. A propulsion system as in claim 15 wherein said disk may be selectively raised or lowered in relation to said vehicle.

18. A propulsion system for propelling a vehicle for movement in relation to a fluid, comprising:
    a fan mounted for rotation in said vehicle, said fan comprising a solid circular disk, and a plurality of radially spaced blades extending from the surface of said disk, each of said blades having a generally airfoil shape;

said fan being mounted such that a sector of said fan is relatively more aftward than the other sectors of said fan; and, means for directing the flow of said fluid across said fan, such that the principal volume of flow of said fluid is through said aftward sector of said fan and in the rearward direction in relation to said vehicle.

19. A propulsion system for propelling a vehicle for movement in relation to a fluid, comprising:

a fan mounted for rotation in said vehicle, said fan comprising a solid circular disk, and a plurality of radially spaced blades extending from the surface of said disk, each of said blades having a generally airfoil shape;

said fan being mounted such that the axis of rotation of the disk is substantially in the horizontal plane of the vehicle, whereby the orientation of said fan defines a sector of the fan which is aftward in relation to the other sectors of the fan; and means for directing the flow of said fluid such that the flow of said fluid across said fan is preferentially through said aftward sector of said fan and in the rearward direction in relation to said vehicle.

20. A combined thrust and pressure fan comprising a first and second solid circular disks arranged concentrically in relation to one another, each of said disks having a plurality of radially spaced blades extending from the surface of the disks said blades of said first disk being concentrically nested radially inward of said blades of said second disk, each of said blades having a generally airfoil shape, said first disk rotating in a first direction in relation to an axis of rotation and said second disk rotating in a second direction in relation to said axis of rotation, said second direction being opposite said first direction such that said first and second disks counter-rotate about said axis of rotation.

21. A propulsion system for propelling a vehicle for movement in relation to a fluid, comprising:

a fan mounted for rotation in said vehicle, said fan comprising a first and second solid circular disks arranged concentrically in relation to one another, each of said disks having a plurality of radially spaced blades extending from the surface of the disks, each of said blades having a generally airfoil shape;

said fan being mounted such that the axis of rotation of said disks is substantially in the horizontal plane of the vehicle, whereby the orientation of said fan defines a sector of the fan which is aftward in relation to the other sectors of the fan;

means for directing the flow of said fluid such that the flow of said fluid across said fan is preferentially through said aftward sector of said fan and in the rearward direction in relation to said vehicle; and, means for rotating said first and second disks in counter-rotating directions.

* * * * *